United States Patent
Wang et al.

(10) Patent No.: US 12,195,349 B2
(45) Date of Patent: Jan. 14, 2025

(54) PREPARATION METHOD AND APPLICATION OF AMORPHOUS METAL OXIDE HOLLOW MULTI-SHELL MATERIAL

(71) Applicant: INSTITUTE OF PROCESS ENGINEERING, CHINESE ACADEMY OF SCIENCES, Beijing (CN)

(72) Inventors: Dan Wang, Beijing (CN); Xuanbo Chen, Beijing (CN); Nailiang Yang, Beijing (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/547,403

(22) PCT Filed: Jun. 25, 2021

(86) PCT No.: PCT/CN2021/102381
§ 371 (c)(1),
(2) Date: Aug. 22, 2023

(87) PCT Pub. No.: WO2022/183640
PCT Pub. Date: Sep. 9, 2022

(65) Prior Publication Data
US 2024/0140818 A1    May 2, 2024

(30) Foreign Application Priority Data
Mar. 4, 2021    (CN) .......................... 202110241311.7

(51) Int. Cl.
*C01G 35/00* (2006.01)
*B01D 1/00* (2006.01)
(Continued)

(52) U.S. Cl.
CPC .......... *C01G 35/00* (2013.01); *B01D 1/0035* (2013.01); *C02F 1/048* (2013.01); *C02F 1/14* (2013.01);
(Continued)

(58) Field of Classification Search
CPC ....... C01G 35/00; B01D 1/0035; C02F 1/048; C02F 1/14
See application file for complete search history.

(56) References Cited

U.S. PATENT DOCUMENTS

2019/0198261 A1*    6/2019    Choi ..................... H01G 11/46

FOREIGN PATENT DOCUMENTS

| CN | 102464304 A | * | 5/2012 | ............. C01B 13/14 |
| CN | 103247777 A | * | 8/2013 | ............. Y02E 60/10 |

(Continued)

OTHER PUBLICATIONS

Haoming Bao, "Nanoscaled Amorphous TiO2 Hollow Sheres: TiCl4 Liquid Droplet-Based Hydrolysis Fabrication and Strong Hollow Structure-Enhanced Surface-Enhanced Raman Scattering Effects", Langmuir 2017, 33, 5430-5438.*
(Continued)

*Primary Examiner* — Wayne A Langel
(74) *Attorney, Agent, or Firm* — Flener IP & Business Law; Zareefa B. Flener

(57) ABSTRACT

The present invention relates to the technical field of functional materials, and in particular to an amorphous metal oxide hollow multi-shell material and a preparation method therefor and an application thereof. The method includes the following steps: 1) performing a heating reaction on a carbon source aqueous solution, filtering, washing, and drying to obtain a carbon sphere template; 2) dispersing the carbon sphere template obtained in step 1) in a first metal salt solution, heating, adsorbing, and drying to obtain a first solid precursor; 3) dispersing the solid precursor obtained in step 2) in a second metal salt solution again, adsorbing, and drying to obtain a second solid precursor; and 4) calcinating the second solid precursor obtained in step 3) to obtain the amorphous metal oxide hollow multi-shell material. According to the present invention, a defect-controllable doping energy level is introduced into a metal oxide hollow sphere by means of a two-step enhanced adsorption method, so that efficient absorption of wave bands in a solar spectrum is achieved.

10 Claims, 6 Drawing Sheets

(51) Int. Cl.
 *C02F 1/04* (2023.01)
 *C02F 1/14* (2023.01)

(52) U.S. Cl.
 CPC ...... *C01P 2002/02* (2013.01); *C01P 2002/72* (2013.01); *C01P 2004/04* (2013.01); *C01P 2006/42* (2013.01); *C01P 2006/60* (2013.01)

(56) References Cited

FOREIGN PATENT DOCUMENTS

| CN | 104098134 A | 10/2014 |
| CN | 106328914 A | 1/2017 |
| CN | 109876809 A | 6/2019 |
| CN | 111039329 A | 4/2020 |
| JP | H0264016 A | 3/1990 |
| JP | 2015009238 A | 1/2015 |

OTHER PUBLICATIONS

Rongbo Zheng, "Synthesis, charatectristics and photdegradation study of mixed-phase titania hollow submicrospheres with rough surface" Applioed Surface Science 255 (2009) 5989-5994.*
Chinese International Search Report for PCT/CN2021/102381; issue Dec. 1, 2021.
Zirui Lou et al.; The crystalline/amorphous contact in $Cu_2O/Ta_2O_5$ heterostructures: increasing its sunlight-driven overall water splitting efficiency; Royal Society of Chemistry; Jan. 3, 2017; p. 2732-2738; online.
Jiangyan Wang et al.; Hollow multishelled structures revive high energy density batteries; Royal Society of Chemistry; Jul. 9, 2020; pp. 1287-1292; online.
CNIPA First Office Action for CN202110241311.7, issued Jun. 1, 2022, no translation available.
Jiangyan Wang et al.; Multi-shelled $Cr_2O_3$ hollow microspheres for high-performance lithium-ion battery anode materials (in Chinese). Chin Sci Bull, 2019, 64: 3623-3631, doi: 10.1360/N972019-00297.

* cited by examiner

PREPARATION METHOD AND APPLICATION OF AMORPHOUS METAL OXIDE HOLLOW MULTI-SHELL MATERIAL

CROSS REFERENCE TO RELATED APPLICATIONS

The present application claims the priority of the Chinese patent application filed on Mar. 4, 2021 with an application number of 202110241311.7, which is incorporated herein by reference in its entirety.

TECHNICAL FIELD

The present invention relates to the technical field of functional materials, and in particular to an amorphous metal oxide hollow multi-shell material and a preparation method therefor and an application thereof.

BACKGROUND ART

As a clean energy which can be utilized permanently, the solar energy has an enormous development potential, however, due to such factors as low energy density and instability, more efficient light conversion materials need to be designed, to achieve efficient acquisition and utilization of the solar energy. A photo-thermal interface water evaporation system driven by sunlight is an efficient and convenient water purification technology that has emerged in recent years. The photo-thermal interface water evaporation system only uses sunlight to heat the photo-thermal material to a temperature close to a boiling point of water, and then guides a water source to the surface of materials, to achieve purification and sterilization effects through surface evaporation and recycling of condensed water. Compared with traditional bulk heating water, the photo-thermal interface water evaporation system has unique advantages mainly as follows: firstly, a surface heating system can reduce the heating volume, enhance heat transfer efficiency, and reduce heat loss; and secondly, the energy consumed for the production of per unit volume of steam is significantly reduced. In addition, the photo-thermal interface water evaporation system driven by sunlight has such characteristics of low requirements for water source quality, efficient photo-thermal conversion efficiency, fast water evaporation rate, significant sterilization and water purification effects, and convenient portability of devices. The photo-thermal interface water evaporation system can be used for seawater desalination, conversion of sewage into drinking water, purification of wastewater containing bacterium, and can also be used for rapid preparation of drinking water in extremely harsh environments.

Multi-shell hollow micro/nanostructures have the characteristics of large specific surface area, light density, special internal cavity structure, and adjustable shell walls composed of low dimensional nanoparticles or nanorods, and are widely used in many fields, such as drug release, catalysis, sensors, water pollution control, nanoreactors, and energy storage systems. When the multi-shell hollow micro/nanostructures are applied in the field of photo-thermal water evaporation, metal oxide hollow multi-shell materials can scatter incident light for multiple times between the shells, thereby effectively extending an optical path, enhancing the capability of a material in capturing light, facilitating efficient absorption of sunlight in a full spectrum, and improving the efficiency of photo-thermal conversion. In addition, metal oxide hollow multi-shell materials can provide more effective specific surface area, thereby being conducive to rapid transportation and evaporation of water, and further improving reaction efficiency.

At present, there are two main methods to prepare multi-shell oxide hollow spheres: a soft template method and a hard template method. The soft template method refers to a method in which micelles or emulsion droplets are taken as templates in a solution for a chemical reaction at an interface of two phases and are finally separated and dried to obtain hollow microspheres. The soft template method reported at present is only suitable for the preparation of multi-shell hollow spheres of specific compounds, and morphological uniformity of the synthesized products is poor, and a large amount of organic solvents are needed to prepare inverse micelles or inverse microemulsions. The soft template method is not suitable for large-scale production and is difficult to have universal applicability. The hard template method refers to a method in which monodispersed inorganic substances, polymers or resin micro-nano particles are taken as templates to deposit various chemical materials on the surface, and then the templates are taken out by calcination or solvent extraction to form uniform hollow sphere materials. Core-shell materials prepared by the hard template method have the advantages of good monodispersity, high repeatability and stable product morphology, and are widely concerned by researchers.

CN102464304A discloses a multi-shell metal oxide hollow sphere and a preparation method thereof, wherein a carbon sphere template is prepared by a hydrothermal method; metal salt is dissolved in a carbon sphere suspension liquid, the quantity, depth and gradient distribution of metal salt entering carbon spheres are controlled by adjusting the concentration of the metal salt, and adsorption conditions such as the pH value of the solution, soaking temperature and time; and the multi-shell metal oxide hollow spheres can be obtained by heat treatment on the carbon spheres adsorbed with metal ions. As to the hollow spheres prepared with the method, the shell is formed by stacking nanocrystalline grains of metal oxides, and the number of shells can be adjusted between two and four, and the size and shell thickness of the hollow spheres can be controlled. The method of the present invention is simple, easy to operate, high in controllability, low in pollution, low in cost and universal. The prepared product has a hollow structure and a shell with a nano-scale thickness, at the same time, the multi-layer structure can effectively use the internal space for gas sensing and photocatalysis, thereby showing better performance than traditional nano materials and single-shell hollow spheres.

CN103247777A discloses a cobaltsic oxide multi-shell hollow sphere anode material applied to lithium ion batteries and a preparation method therefor. A carbon sphere made by utilizing a hydrothermal method is taken as a template, and single-shell, double-shell, three-shell and four-shell cobaltsic tetroxide hollow spheres were prepared by controlling a ratio of water to ethanol in a cobalt salt solution, the temperature of solution and the adsorption capacity of carbon spheres and by further controlling the number and depth of cobalt ions in carbon spheres. However, the multi-shell hollow spheres prepared through the method are applied in manufacturing anode materials of lithium ion batteries, and the application in the photo-thermal field is still limited.

The products obtained through the above preparation method are all metal oxide crystals. In addition, there are no examples on the application of multi-shell hollow spheres in photo-thermal research, and the photo-thermal research on semiconductors is also only limited to narrow band gap semiconductor nanoparticles and nanowire arrays such as copper oxide and copper sulfide. Therefore, the research on how to controllably synthesize amorphous multi-shell hollow spheres with different defect contents by utilizing advantages of multi-shell hollow spheres in nanoscale depth and further to improve the photo-thermal performance of metal oxides through controlling the contents of defect states inside amorphous oxides is still lacking.

SUMMARY OF THE INVENTION

Based on the above shortcomings, the present invention provides a preparation method for an amorphous metal oxide hollow multi-shell material and an application of the same. Through two-step enhanced adsorption, a concentration gradient of metal ions in the adsorbed carbon sphere template is obvious, such that an amorphous metal oxide hollow multi-shell material capable of efficiently absorbing solar spectrum can be obtained after calcination.

To achieve the above object, the following technical solutions are adopted in the present invention:

the present invention provides a preparation method for an amorphous metal oxide hollow multi-shell material, including the following steps:

1) placing a carbon source aqueous solution in a reactor for a heating reaction, filtering, washing, and drying to obtain a carbon sphere template;
2) dispersing the carbon sphere template obtained in step 1) in a first metal salt solution, heating, adsorbing, and drying to obtain a first solid precursor;
3) dispersing the solid precursor obtained in step 2) in a second metal salt solution again, adsorbing, and drying to obtain a second solid precursor; and
4) calcinating the second solid precursor obtained in step 3) to obtain the amorphous metal oxide hollow multi-shell material;

wherein the concentration of hydrated ions in the second metal salt solution is greater than or equal to the concentration of hydrated ions in the first metal salt solution.

In the method, calcination temperature and calcination atmosphere are major factors for synthesizing amorphous oxides and regulating contents of defect states inside amorphous oxides. A metal oxide material with a high melting point is selected, in the metal oxide, the diffusion and migration energy of oxygen atoms is low, a network structure of oxygen atoms can be formed at a low temperature, compared with oxygen atoms, the diffusion and migration energy of these metal ions with a high melting point is very high, when the migration distance within a certain time is less than the size of a unit cell, an amorphous oxide will be formed. Therefore, an amorphous oxide will be formed when the calcination temperature is controlled to be below the crystallization temperature of the metal oxide, that is, when the calcination heat cannot reach the migration and diffusion energy of metal ions. The atmosphere (oxygen partial pressure) during calcination directly controls contents of defect states of the amorphous oxides, and a general rule is that the lower the oxygen partial pressure, the higher the contents of obtained defect states of the amorphous oxides. The contents of defect states of the amorphous oxides are major regulating modes in obtaining efficient light absorption materials with a wide absorption range and high absorption strength.

On the other hand, the selection of solvents for adsorption of metal salts by carbon spheres is also very important. Different solvents are selected as precursor solutions, thereby leading to significant differences in the adsorption depth of metal ions in the adsorbed carbon sphere template. Firstly, the ability of different solvents in dissolving and dispersing metal salts varies, and the aggregation size of metal cations in solvents varies greatly. In step (2), the metal salt solution with a smaller ion aggregation radius can be more deeply adsorbed into the interior of the carbon spheres through dispersion and stirring adsorption operations; in step (3), the metal salt solution with a larger ion aggregation radius is mainly concentrated on the surface of the carbon spheres through dispersion and adsorption operations. In this way, the solid obtained in step (3) has a larger metal adsorption capacity and concentration gradient, and the metal oxide hollow spheres obtained after calcination have more shells. At the same time, when the solid is applied to the field of surface photo-thermal water evaporation, there are differences in the defect contents of each shell in the amorphous multi shells, and the absorption efficiency of each layer can be superimposed, and a relatively closed spherical shape is formed inside the multi shells. The effect of light confinement is significant, thereby achieving an effect of efficient light absorption. Amorphous oxides such as tantalum oxide are indirect band gap semiconductors, and the photo-thermal conversion process involves phonon assisted heat generation, that is, mutual vibration and heat transfer between crystal cells. Secondly, the defect of high contents increases the level of phonon scattering, and ultimately enhances the efficiency of photo-thermal conversion.

Compared with the traditional mechanical ball milling method, in the method of the present invention in which the carbon-containing precursor aqueous solution is put into a reactor for hydrothermal reaction, and a carbon ball template is obtained after cooling, filtering, washing and drying, the carbon sphere prepared by a hydrothermal method has uniform particle size and controllable size, and at the same time contains a large number of active functional groups on the surface, has excellent hydrophilicity and surface reaction activity, is more conducive to adsorption of metal ions, and is a common template for preparing core-shell structure materials.

The adsorption mentioned in step 2) of the present invention is enhanced adsorption. Enhanced adsorption means a method in which metal ions are adsorbed by an enhanced carbon sphere template under a heating state when the carbon sphere template and the metal salt solution are put into a beaker for heating and adsorbing twice, and a solid precursor rich in metal salt ions is obtained after cooling, centrifuging, washing and drying.

As preferably, the carbon source in step 1) includes one or more than two of glucose, fructose, sucrose, maltose, starch and citric acid; and further preferably, the carbon source is sucrose.

The concentration of carbon source in the carbon source aqueous solution is 0.1-6 M, for example, the concentration can be 0.1 M, 0.5 M, 1 M, 1.5 M, 2 M, 2.5 M, 3 M, 3.5 M, 4 M, 4.5 M, 5 M, 5.5 M or 6 M, preferably, 1-5 M, and further preferably 2-3 M.

As preferably, the heating reaction in step 1) is a hydrothermal reaction, the temperature of the hydrothermal reaction is 175-220° C., for example, the temperature can be 175° C., 180° C., 185° C., 190° C., 195° C. or 200° C., further preferably, 190-205° C., and even further preferably, 195-200° C.;

the time of the hydrothermal reaction is 100-180 min, for example, the time can be 100 min, 110 min, 120 min, 130 min, 140 min, 150 min, 160 min, 170 min or 180 min, further preferably, 120-140 min, and even further preferably, 125-135 min;

the drying temperature is 60-100° C., for example, the drying temperature can be 60° C., 65° C., 70° C., 75° C., 80° C., 85° C., 90° C., 95° C. or 100° C., further preferably, 70-90° C., and even further preferably, 75-85° C.;

the drying time is 6-24 h, for example, the drying time can be 6 h, 8 h, 10 h, 12 h, 14 h, 16 h, 18 h, 20 h, 22 h or 24 h, further preferably, 15-24 h, and even further preferably, 18-20 h;

one or a combination of any two of deionized water, methanol and ethanol is adopted for washing, for example, it can be a combination of deionized water, methanol and ethanol, a combination of deionized water and methanol, a combination of deionized water and ethanol or a combination of methanol and ethanol.

The washing times are 2-5 times, for example, the washing times can be twice, three times, four times or five times, preferably, three to four times.

As preferably, the first metal salt solution and the second metal salt solution in step 2) and step 3) both include one or more than two of tantalum chloride solution, tantalum nitrate solution, tantalum sulfate solution, tantalum acetylacetone solution, tantalum oxalate solution and tantalum ethoxide solution; further preferably, one or a combination of at least two of tantalum chloride solution, tantalum acetylacetone solution and tantalum oxalate solution; and the metal salt solution selected in the present invention is a metal salt with a smaller hydrated ionic radius, thereby enhancing the adsorption depth of metal in the carbon sphere and being used for absorbing for multiple times visible light and infrared light in the solar spectrum.

The concentration of the first metal salt solution is 0.01-0.5 M, for example, the concentration can be 0.01 M, 0.1 M, 0.15 M, 0.2 M, 0.25 M, 0.3 M, 0.35 M, 0.4 M, 0.45 M or 0.5 M, further preferably, 0.05-0.2 M, and even further preferably, 0.1-0.15 M;

the concentration of the second metal salt solution is 0.5-5 M, for example, the concentration can be 1 M, 1.5 M, 2 M, 2.5 M, 3 M, 3.5 M, 4 M, 4.5 M or 5 M, further preferably, 1-3 M, and even further preferably, 1.5-2.5 M;

wherein a solvent of the first metal salt solution includes one or more than two of water, acetone and ethanol.

As preferably, the solvent of the first metal salt solution includes acetone and/or ethanol, and the solvent of the first metal salt solution is further preferably ethanol, the solvent of the second metal salt solution includes water, ethanol or a mixture thereof, and the solvent of the second metal salt solution is further preferably water.

As preferably, the adsorption in step 2) is medium-temperature stirring adsorption;

the adsorption temperature is 20-60° C., for example, the adsorption temperature can be 20° C., 25° C., 30° C., 35° C., 40° C., 45° C. or 60° C., further preferably, 30-60° C., and even further preferably, 40-50° C.;

the adsorption time is 1-48 h, further preferably, 3-36 h, and even further preferably, 6-24 h;

after adsorption, a mixture obtained from adsorption is centrifuged, solids in the lower layer are taken out and cleaned; one or a combination of any two of deionized water, methanol and ethanol is adopted for cleaning, for example, it can be a combination of deionized water, methanol and ethanol, a combination of deionized water and methanol, a combination of deionized water and ethanol or a combination of methanol and ethanol.

the washing times are 2-5 times, for example, the washing times can be twice, three times, four times or five times, and further preferably, three to four times;

the drying temperature is 60-100° C., for example, the drying temperature can be 60° C., 65° C., 70° C., 75° C., 80° C., 85° C., 90° C., 95° C. or 100° C., further preferably, 70-90° C., and even further preferably, 75-85° C.;

the drying time is 6-24 h, for example, the drying time can be 6 h, 8 h, 10 h, 12 h, 14 h, 16 h, 18 h, 20 h, 22 h or 24 h, further preferably, 15-24 h, and even further preferably, 18-20 h.

The adsorption in step 3) is enhanced stirring adsorption by heating at a medium temperature;

the adsorption temperature is 20-60° C., for example, the adsorption temperature can be 20° C., 25° C., 30° C., 35° C., 40° C., 45° C., 50° C., 55° C. or 60° C., further preferably, 30-50° C., and even further preferably, 35-45° C.;

the adsorption time is 4-24 h, for example, the adsorption time can be 4 h, 6 h, 8 h, 10 h, 12 h, 14 h, 16 h, 18 h, 20 h, 22 h or 24 h, further preferably, 8-20 h, and even further preferably, 10-18 h;

after adsorption, the mixture obtained from adsorption is filtered and cleaned, one or a combination of any two of deionized water, methanol and ethanol is adopted for cleaning, for example, it can be a combination of deionized water, methanol and ethanol, a combination of deionized water and methanol, a combination of deionized water and ethanol or a combination of methanol and ethanol; the cleaning times are two to five times, for example, the cleaning times can be twice, three times, four times or five times, further preferably, three to four times; the cleaning time is 0.5-24 h, for example, the cleaning time can be 2 h, 4 h, 6 h, 8 h, 10 h, 11 h, 14 h, 16 h, 18 h, 20 h, 22 h or 24 h, further preferably, 5-20 h, and even further preferably, 10-15 h;

the drying temperature is 60-100° C., for example, the drying temperature can be 60° C., 65° C., 70° C., 75° C., 80° C., 85° C., 90° C., 95° C. or 100° C., further preferably, 70-90° C., and even further preferably, 75-85° C., the drying time is 6-24 h, for example, the drying time can be 6 h, 8 h, 10 h, 12 h, 14 h, 16 h, 18 h, 20 h, 22 h or 24 h, further preferably, 15-24 h, and even further preferably, 18-20 h.

As preferably, calcinating in step 4) is performed in a muffle furnace, a tube furnace or a kiln;

the calcination temperature is 200-600° C., for example, the calcination temperature can be 200° C., 250° C., 300° C., 350° C., 400° C., 450° C., 500° C., 550° C. or 600° C., further preferably, 300-550° C., and even further preferably, 400-500° C.

the calcination time is 0.5-10 h, for example, the calcination time can be 0.5 h, 1 h, 1.5 h, 2 h, 2.5 h, 3 h, 3.5 h, 4 h, 4.5 h, 5 h, 5.5 h, 6 h, 6.5 h, 7 h, 7.5 h, 8 h, 8.5 h, 9 h, 9.5 h or 10 h, further preferably, 1-6 h, and even further preferably, 2-4 h;

the heating rate of calcination is 0.1-20° C./min, for example, the heating rate can be 0.5° C./min, 1° C./min, 1.5° C./min, 2° C./min, 2.5° C./min, 3° C./min, 3.5° C./min, 4° C./min, 4.5° C./min, 5° C./min, 5.5° C./min, 6° C./min, 6.5° C./min, 7° C./min, 7.5° C./min, 8° C./min, 8.5° C./min, 9° C./min, 9.5° C./min or 10°

C./min, further preferably, 0.5-10° C./min, and even further preferably, 1-10° C./min;

the calcination atmosphere is air, or a mixture of nitrogen and oxygen, oxygen accounts for 5%-40% in the mixture of nitrogen and oxygen, for example, oxygen can account for 5%, 8%, 10%, 12%, 15%, 18%, 20%, 25%, 30%, 35%, 40%. Further preferably, oxygen accounts for 10%-30% in the mixture of nitrogen and oxygen, and even further preferably, oxygen accounts for 15%-25% in the mixture of nitrogen and oxygen. In the present invention, a mixed atmosphere of nitrogen and oxygen is adopted for calcination, hollow multi-shell hollow spheres are regulated and prepared, and contents of multi-shell defect states are further regulated. A large-scale regulation of the capability of the hollow multi shells in absorbing sunlight spectrum optimizes the photo-thermal conversion efficiency and the water evaporation rate.

In the preparation method of the present invention, before calcinating, step 1) and step 2) can be repeated for once to five times, to obtain an amorphous metal oxide hollow multi-shell material with two to four shells.

In the present invention, the contents of different metal oxides in the shell can be changed through adjusting synthesis conditions such as the concentration, adsorption temperature, repeated adsorption times and calcination atmosphere of two types of metal salt with different hydration ion radii, to achieve efficient absorption of light of different wavelengths by different shells, further generate a sequential absorption effect of the full spectrum in the solar spectrum, enhance the light absorption ability of the prepared multi-shell hollow sphere photo-thermal material, and further improve the photo-thermal conversion efficiency of the prepared multi-shell hollow sphere photo-thermal material.

The present invention provides an amorphous metal oxide hollow multi-shell material obtained through the preparation method, and the amorphous metal oxide hollow multi-shell material includes at least one cavity and at least one layer of shell wall, wherein the surface of the shell wall is stacked with two or more metal oxides, the metal oxides are nanoparticles or nanorods; and the metal oxides include, preferably but not limited to, one or more than two of tantalum oxide, niobium oxide, hafnium oxide, rhenium oxide, titanium oxide, and tungsten oxide.

Two to four layers of shell walls are available, for example, two layers, three layers or four layers are available;

the shell wall can absorb solar spectrum in sequence in multiple stages; the defect content of the metal oxides deposited on the outer shell wall surface of the shell wall is less than the defect content of the metal oxides deposited on the inner shell wall surface.

Wherein the metal oxides stacked on the surface of the shell wall are defect-controllable;

an ultraviolet light part, a visible light part, a near-infrared light part and a mid-infrared light part in the solar spectrum are absorbed in multiple stages in sequence; and the absorbance of the metal oxides of the shell wall is adjustable within 10-95%.

The present invention provides a metal oxide material used for photo-thermal water evaporation, wherein the metal oxide material used for photo-thermal water evaporation includes the amorphous metal oxide hollow multi-shell material; and the metal oxide material used for photo-thermal water evaporation performs efficient surface water evaporation at an evaporation speed of 1.6 kg/m² h under the irradiation of a solar simulator of 100 mW/cm².

Compared with the prior art, the present invention has the following beneficial effects:

1) The composite metal oxide hollow multi-shell material prepared by the present invention has stronger light absorption ability, and the multi-shell complex multi-level structure can obviously prolong a light path of incident light in the material. In addition, the characteristics of the multi shells enable the material to have a larger specific surface area, such that the material and water contact more sufficiently. When the above hollow spheres are applied to photo-thermal water evaporation, efficient full spectrum absorption of solar spectrum can be achieved. Under the irradiation of a solar simulator of 100 mW/cm², surface water evaporation can be carried out efficiently at an evaporation speed of 1.6 kg/m² h. Moreover, the reaction can be stable for more than 48 h, and its performance is much higher than that of the nanoparticles with the same composition.

2) In the present invention, through a two-step enhanced adsorption method, metal oxide hollow spheres introduce doping energy levels with controllable defects, to realize efficient absorption of various wavebands in the solar spectrum.

DETAILED DESCRIPTION OF THE EMBODIMENTS

Figure 1:
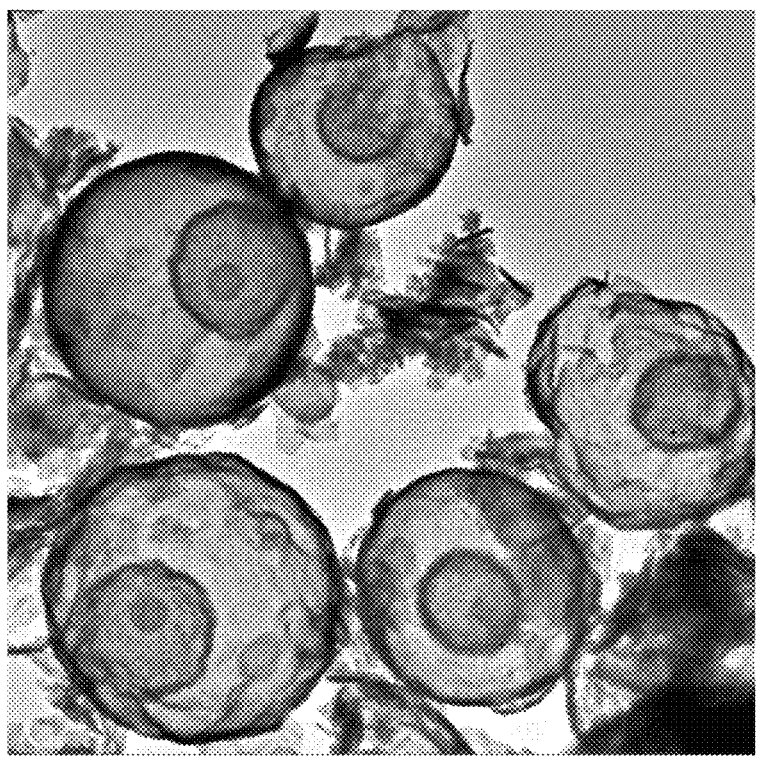
FIG. 1 is a transmission electron microscope photo of an amorphous three-shell $Ta_2O_5$ hollow sphere prepared in Embodiment 1 of the present invention.
Figure 2:
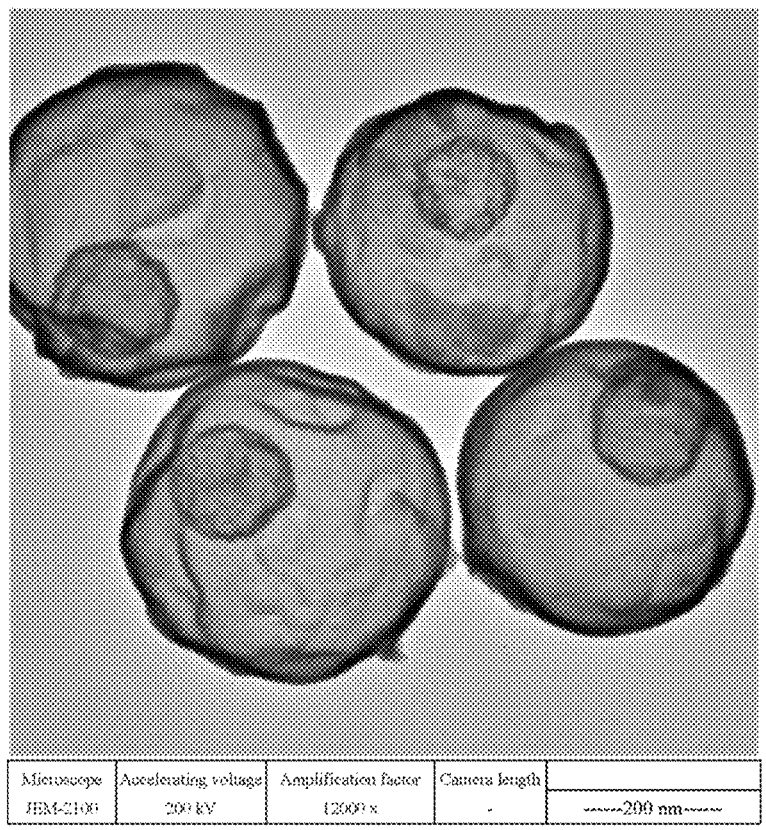
FIG. 2 is a transmission electron microscope photo of an amorphous two-shell $Ta_2O_5$ hollow sphere prepared in Embodiment 2 of the present invention.
Figure 3:
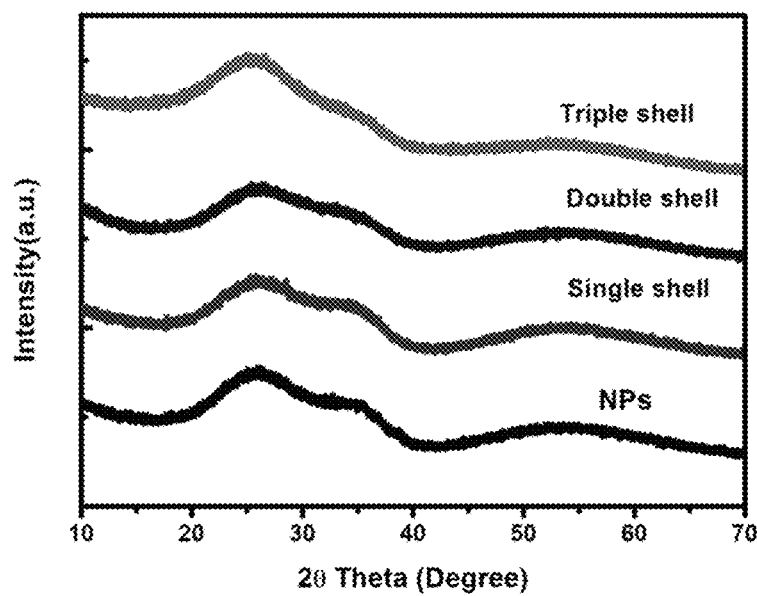
FIG. 3 is an X-ray diffraction diagram of an amorphous $Ta_2O_5$ hollow sphere under different shells of the present invention.

The present invention is further illustrated in details below with specific embodiments.

The present invention provides a preparation method for an amorphous metal oxide hollow multi-shell material, and the method includes:

(a) putting a carbon source aqueous solution at a concentration of 0.1-6 M into a reactor at 175-220° C. for a hydrothermal reaction for 100-180 min, naturally cooling and filtering, washing for two to five times, drying a product at 60-100° C. for 6-24 h, to obtain a carbon sphere template;

(b) dispersing the carbon sphere template obtained in step (a) in a first metal salt solution at a concentration of 0.01-0.5 M, wherein the first metal salt solution is one or a combination of at least two of tantalum chloride solution, tantalum nitrate solution, tantalum sulfate solution, tantalum acetylacetone solution, tantalum oxalate solution and tantalum ethoxide solution, heating and adsorbing for 1-48 h at 20-60° C., centrifuging the adsorbed mixture, taking out a solid on a lower layer, washing with deionized water, methanol or ethanol for two to five times, drying at 60-100° C. for 6-24 h, to obtain a first solid precursor;

(c) dispersing the first solid precursor obtained in step (b) in a second metal salt solution at a concentration of 0.5-5 M, wherein the second metal salt solution is one or a combination of at least two of tantalum chloride solution, tantalum nitrate solution, tantalum sulfate solution, tantalum acetylacetone solution, tantalum oxalate solution and tantalum ethoxide solution, stirring and adsorbing at 20-60° C. for 4-24 h and then filtering, washing with deionized water, methanol or ethanol for two to five times, washing for 0.5-24 h, drying at 60-100° C. for 6-24 h, to obtain a solid precursor; and (d) placing the solid precursor obtained in step (c) in a muffle furnace or a kiln, calcinating for 0.5-10 h in the air or in an atmosphere in which oxygen accounts for 5%-4-% in the mixture of oxygen and nitrogen, the calcination temperature is 200-600° C., the heating rate is 0.1-20° C./min, and then cooling to obtain the amorphous metal oxide hollow multi-shell material.

Embodiment 1

A preparation method for an amorphous metal oxide hollow multi-shell material is provided, and the method includes:

(1) putting a sucrose aqueous solution at a concentration of 1.5 M into a reactor at 200° C. for a hydrothermal reaction for 135 min, naturally cooling and filtering, washing with water for three times, placing a product in an oven at 60° C. and drying for 24 h, to obtain a carbon sphere template with a diameter of 2.9 µm;

(2) dispersing the carbon sphere template obtained in step (1) in 30 mL of $TaCl_5$ solution at a concentration of 0.1 M, uniformly dispersing the carbon spheres by ultrasonic, placing in a beaker, heating and adsorbing for 4 h in a water bath at 30° C., centrifuging the adsorbed mixture, taking out the solid on the bottom layer, washing with deionized water for three times, placing in an oven at 60° C. and drying for 24 h, to obtain a first solid precursor;

(3) dispersing the first solid precursor obtained in step (2) in a $TaCl_5$ solution at a concentration of 0.5 M, stirring and adsorbing at 40° C. for 24 h and then filtering, washing with deionized water for three times, placing in an oven at 60° C. and drying for 24 h to obtain a second solid precursor;

(4) placing the second solid precursor obtained in step (3) in a muffle furnace, heating up to 500° C. at a rate of 0.5° C./min, wherein the calcination atmosphere is a mixture of nitrogen and oxygen, and oxygen accounts for 15% in a mixture of nitrogen and oxygen, calcinating at a constant temperature for 2 h, and naturally cooling to obtain a three-shell $Ta_2O_5$ hollow sphere, wherein the size of the shell is approximately 0.8 µm.

Figure 4:
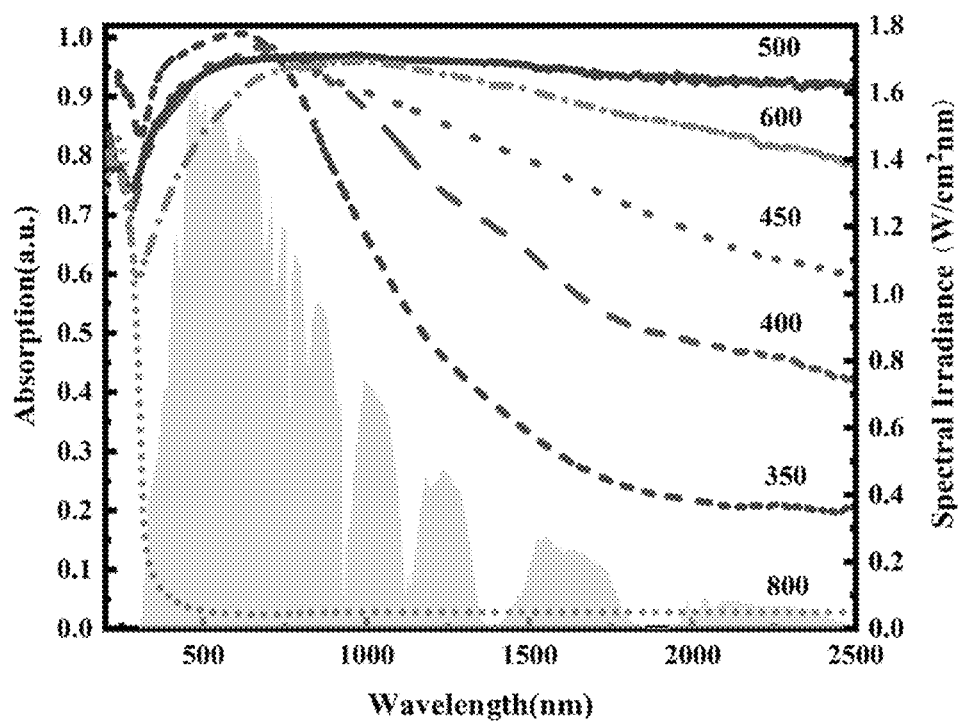
FIG. 4 is an ultraviolet-visible light absorption spectrogram of the three-shell $Ta_2O_5$ calcined at different temperatures of the present invention.
Figure 5:
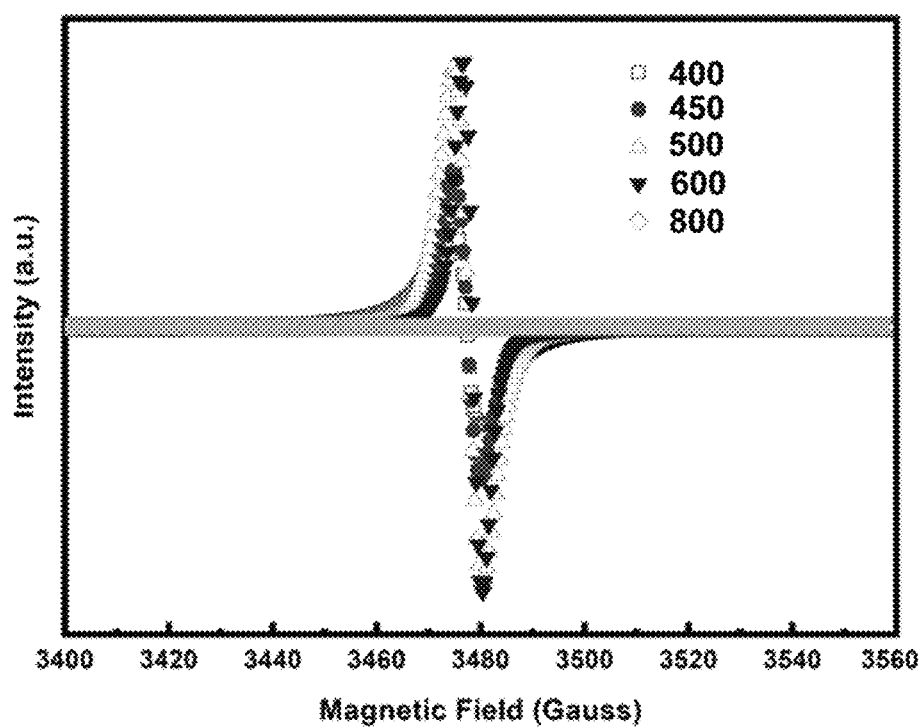
FIG. 5 is an electron paramagnetic resonance spectrogram of an amorphous three-shell $Ta_2O_5$ hollow sphere prepared in Embodiment 1 of the present invention.
Figure 6:
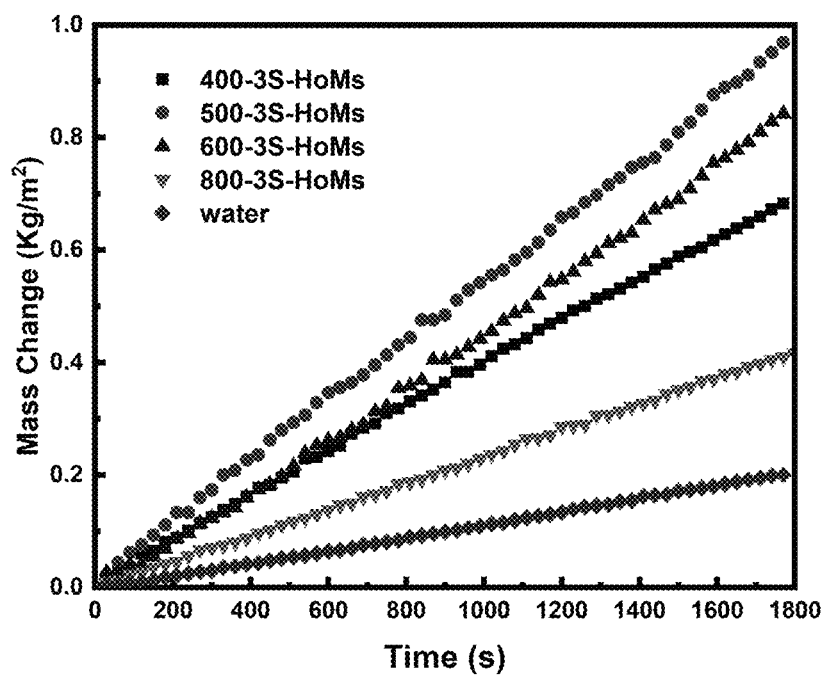
FIG. 6 is a performance chart of photo-thermal water evaporation of a multi-shell $Ta_2O_5$ hollow sphere prepared in Embodiment 1 of the present invention.
Figure 7:
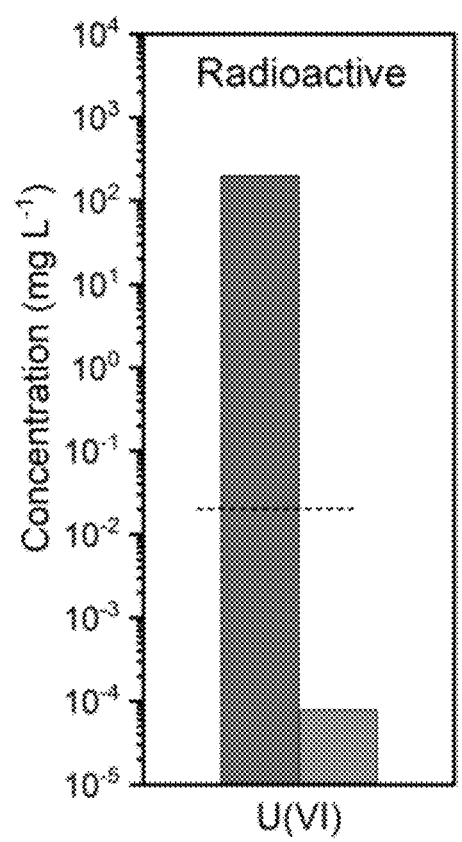
FIG. 7 is a comparison diagram of the concentration of amorphous three-shell $Ta_2O_5$ hollow spheres prepared in Embodiment 1 of the present invention before and after photo-thermal evaporation purification of uranium-containing solution.
Figure 8:
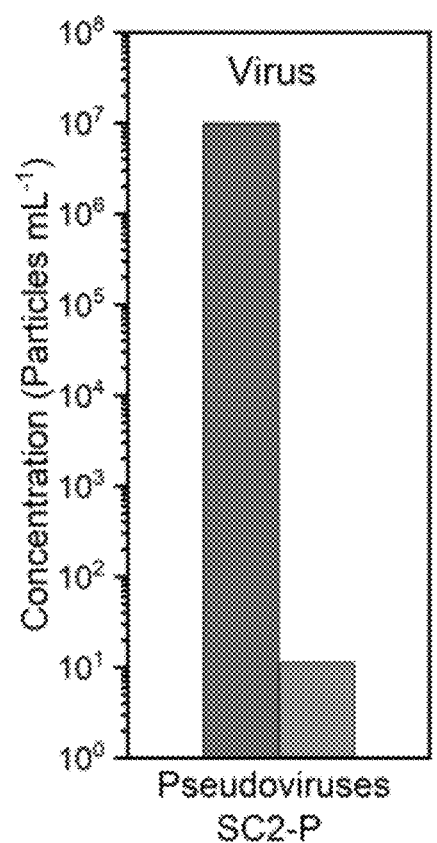
FIG. 8 is a comparison diagram of the concentration of amorphous three-shell $Ta_2O_5$ hollow spheres prepared in Embodiment 1 of the present invention before and after photo-thermal evaporation purification of SC2-P solution containing pseudovirus.

The transmission electron microscope photo of the product is as shown in FIG. 1, and the product is an amorphous three-shell hollow sphere. As shown in FIG. 5 which is an electron paramagnetic resonance spectrogram of three-shell hollow spheres formed at different calcination temperatures, amorphous multi shells are formed through calcination at 400° C., 500° C. and 600° C., at a place where g is equal to 2.002, an integrated area first increases and then decreases, and the contents of defect states first increase and then decrease. It can be known from results of absorption spectrum of FIG. 4 and the above rules that, the absorption rate of UV-VIS NIR reaches the maximum at 500° C. Moreover, as shown in FIG. 6, efficient surface water evaporation can be performed at an evaporation speed of 1.6 kg/m$^2$ h under the irradiation of a solar simulator of 100 mW/cm$^2$. Moreover, the reaction can be stable for more than 48 h, and its performance is much higher than that of the reported nanoparticles. Further, an evaporation water source is further expanded to radioactive wastewater containing uranium and culture solution containing pseudovirus (SC2-P). The content of uranium in water before and after evaporation is characterized by ICP, and the characterization results are as shown in FIG. 7, and the content of uranium reduces from 200 ppm to $8*10^{-5}$ ppm. The concentration of uranium has dropped by nearly six orders of magnitude, which is completely consistent with standards of the WHO. The concentration of the solution containing SC2-P before and after evaporation is quantified for the number of viruses by PCR amplification. The characterization results are shown in FIG. 8. The concentration of virus reduces from $10^7$ particles/mL to 11.8 particles/mL after evaporation (the result of concentration for 100 times of the solution collected after evaporation), the virus concentration decreases by 6 orders of magnitude.

Embodiment 2

A preparation method for an amorphous metal oxide hollow multi-shell material is provided, and the method includes:

(1) putting a sucrose aqueous solution at a concentration of 2.5 M into a reactor at 180° C. for a hydrothermal reaction for 130 min, naturally cooling and filtering, washing with water twice, placing a product in an oven at 70° C. and drying for 24 h, to obtain a carbon sphere template with a diameter of 2.7 µm;

(2) dispersing the carbon sphere template obtained in step (1) in 30 mL of tantalum acetylacetone solution at a concentration of 0.2 M, uniformly dispersing the carbon spheres by ultrasonic, placing in a beaker, heating and adsorbing for 3 h in a water bath at 40° C., centrifuging the adsorbed mixture, taking out the solid on the bottom layer, washing with deionized water for three times, placing in an oven at 60° C. and drying for 24 h, to obtain a first solid precursor;

(3) dispersing the first solid precursor obtained in step (2) in a $TaCl_5$ solution at a concentration of 1 M, stirring and adsorbing at 60° C. for 12 h and then filtering, washing with deionized water for three times, placing in an oven at 70° C. and drying for 12 h to obtain a second solid precursor; and (4) placing the second solid precursor obtained in step (3) in a muffle furnace, heating up to 600° C. at a rate of 3° C./min in the air, calcinating at a constant temperature for 1 h, and naturally cooling to obtain a three-shell Ta$_2$O$_5$ hollow sphere, wherein the size of the shell is approximately 0.8 μm.

Efficient surface water evaporation can be performed at an evaporation speed of 1.4 kg/m$^2$ h under the irradiation of a solar simulator of 100 mW/cm$^2$.

Embodiment 3

A preparation method for an amorphous metal oxide hollow multi-shell material is provided, and the method includes:
(1) putting a sucrose aqueous solution at a concentration of 1.5 M into a reactor at 195° C. for a hydrothermal reaction for 150 min, naturally cooling and filtering, washing with water for four times, placing a product in an oven at 70° C. and drying for 18 h, to obtain a carbon sphere template with a diameter of 2.5 μm;
(2) dispersing the carbon sphere template obtained in step (1) in 30 mL of tantalum oxalate solution at a concentration of 0.2 M, uniformly dispersing the carbon spheres by ultrasonic, placing in a beaker, heating and adsorbing for 10 h in a water bath at 20° C., centrifuging the adsorbed mixture, taking out the solid on the bottom layer, washing with deionized water for three times, placing in an oven at 60° C. and drying for 24 h, to obtain a first solid precursor;
(3) dispersing the first solid precursor obtained in step (2) in a tantalum acetylacetone solution at a concentration of 1 M, stirring and adsorbing at 60° C. for 12 h and then filtering, washing with deionized water for three times, placing in an oven at 70° C. and drying for 12 h to obtain a second solid precursor; and
(4) placing the second solid precursor obtained in step (3) in a muffle furnace, heating up to 600° C. at a rate of 35° C./min in an atmosphere in which oxygen accounts for 35% in a mixture of nitrogen and oxygen, calcinating at a constant temperature for 1 h, and naturally cooling to obtain a three-shell Ta$_2$O$_5$ hollow sphere, wherein the size of the shell is approximately 0.8 μm.

Efficient surface water evaporation can be performed at an evaporation speed of 1.3 kg/m$^2$ h under the irradiation of a solar simulator of 100 mW/cm$^2$.

Embodiment 4

A preparation method for an amorphous metal oxide hollow multi-shell material is provided, and the method includes:
(1) putting a sucrose aqueous solution at a concentration of 5 M into a reactor at 200° C. for a hydrothermal reaction for 110 min, naturally cooling and filtering, washing with water for three times, placing a product in an oven at 80° C. and drying for 24 h, to obtain a carbon sphere template with a diameter of 2.5 μm;
(2) dispersing the carbon sphere template obtained in step (1) in 30 mL of tantalum ethoxide solution at a concentration of 0.1 M, uniformly dispersing the carbon spheres by ultrasonic, placing in a beaker, heating and adsorbing for 4 h in a water bath at 20° C., centrifuging the adsorbed mixture, taking out the solid on the bottom layer, washing with deionized water for three times, placing in an oven at 60° C. and drying for 24 h, to obtain a first solid precursor;
(3) dispersing the first solid precursor obtained in step (2) in a tantalum chloride solution at a concentration of 3 M, stirring and adsorbing at 50° C. for 12 h and then filtering, washing with deionized water for three times, placing in an oven at 70° C. and drying for 12 h to obtain a second solid precursor; and
(4) placing the second solid precursor obtained in step (3) in a muffle furnace, heating up to 400° C. at a rate of 2° C./min in an atmosphere in which oxygen accounts for 40% in a mixture of nitrogen and oxygen, calcinating at a constant temperature for 1 h, and naturally cooling to obtain a three-shell Ta$_2$O$_5$ hollow sphere, wherein the size of the shell is approximately 0.8 μm.

Efficient surface water evaporation can be performed at an evaporation speed of 1.5 kg/m$^2$ h under the irradiation of a solar simulator of 100 mW/cm$^2$.

Embodiment 5

A preparation method for an amorphous metal oxide hollow multi-shell material is provided, and the method includes:
(1) putting a sucrose aqueous solution at a concentration of 3 M into a reactor at 210° C. for a hydrothermal reaction for 130 min, naturally cooling and filtering, washing with water for five times, placing a product in an oven at 90° C. and drying for 10 h, to obtain a carbon sphere template with a diameter of 3 μm;
(2) dispersing the carbon sphere template obtained in step (1) in 30 mL of tantalum sulfate solution at a concentration of 0.3 M, uniformly dispersing the carbon spheres by ultrasonic, placing in a beaker, heating and adsorbing for 4 h in a water bath at 50° C., centrifuging the adsorbed mixture, taking out the solid on the bottom layer, washing with deionized water for three times, placing in an oven at 60° C. and drying for 24 h, to obtain a first solid precursor;
(3) dispersing the first solid precursor obtained in step (2) in a tantalum chloride solution at a concentration of 3 M, stirring and adsorbing at 50° C. for 12 h and then filtering, washing with deionized water for three times, placing in an oven at 70° C. and drying for 12 h to obtain a second solid precursor; and
(4) placing the second solid precursor obtained in step (3) in a muffle furnace, heating up to 250° C. at a rate of 5° C./min in an atmosphere in which oxygen accounts for 30% in a mixture of nitrogen and oxygen, calcinating at a constant temperature for 1 h, and naturally cooling to obtain a three-shell Ta$_2$O$_5$ hollow sphere, wherein the size of the shell is approximately 1 μm.

Efficient surface water evaporation can be performed at an evaporation speed of 1.2 kg/m$^2$ h under the irradiation of a solar simulator of 100 mW/cm$^2$.

Embodiment 6

A preparation method for an amorphous metal oxide hollow multi-shell material is provided, and the method includes:
(1) putting a sucrose aqueous solution at a concentration of 2 M into a reactor at 200° C. for a hydrothermal reaction for 160 min, naturally cooling and filtering, washing with water for three times, placing a product in an oven at 60° C. and drying for 24 h, to obtain a carbon sphere template with a diameter of 2.8 pin;
(2) dispersing the carbon sphere template obtained in step (1) in 30 mL of tantalum chloride solution at a concentration of 0.5 M, uniformly dispersing the carbon spheres by ultrasonic, placing in a beaker, heating and adsorbing for 12 h in a water bath at 30° C., centrifuging the adsorbed mixture, taking out the solid on the bottom layer, washing with deionized water for three times, placing in an oven at 60° C. and drying for 24 h, to obtain a first solid precursor;

(3) dispersing the first solid precursor obtained in step (2) in a tantalum chloride acetone solution at a concentration of 4 M, stirring and adsorbing at 40° C. for 24 h and then filtering, washing with deionized water for three times, placing in an oven at 70° C. and drying for 12 h to obtain a second solid precursor; and (4) placing the second solid precursor obtained in step (3) in a muffle furnace, heating up to 550° C. at a rate of 10° C./min in an atmosphere in which oxygen accounts for 10% in a mixture of nitrogen and oxygen, calcinating at a constant temperature for 1 h, and naturally cooling to obtain a three-shell $Ta_2O_5$ hollow sphere, wherein the size of the shell is approximately 1 μm.

For the contents not detailed in the present invention, conventional technical knowledge in the field can be adopted.

Finally, it should be noted that the above embodiments are merely intended to illustrate rather than limiting technical solutions of the present invention. While the present invention has been described in detail with reference to embodiments, those skilled in the art should understand that modifications or equivalent substitutions to the technical solutions of the present invention do not depart from the spirit and scope of the technical solutions of the present invention, and such modifications or equivalent substitutions shall all fall within the scope of the claims of the present invention.

The invention claimed is:

1. A preparation method for an amorphous metal oxide hollow multi-shell material, comprising the following steps:
   1) performing a heating reaction on a carbon source aqueous solution, filtering, washing, and drying to obtain a carbon sphere template;
   2) dispersing the carbon sphere template obtained in step 1) in a first metal salt solution, heating, adsorbing, and drying to obtain a first solid precursor;
   3) dispersing the solid precursor obtained in step 2) in a second metal salt solution again, adsorbing, and drying to obtain a second solid precursor; and
   4) calcinating the second solid precursor obtained in step 3) to obtain the amorphous metal oxide hollow multi-shell material;
   wherein the concentration of hydrated ions in the second metal salt solution is greater than or equal to the concentration of hydrated ions in the first metal salt solution.

2. The preparation method of claim 1, wherein the first metal salt solution and the second metal salt solution in step 2) and step 3) both comprise one or more than two of tantalum chloride solution, tantalum nitrate solution, tantalum sulfate solution, tantalum acetylacetone solution, tantalum oxalate solution and tantalum ethoxide solution;
   the concentration of the first metal salt solution is 0.01-0.5 M; and the concentration of the second metal salt solution is 0.5-5 M; and
   wherein, a solvent of the first metal salt solution comprises one or more than two of water, acetone and ethanol; and a solvent of the second metal salt solution comprises water and/or ethanol.

3. The preparation method of claim 2, wherein the solvent of the first metal salt solution comprises acetone and/or ethanol; and the solvent of the second metal salt solution is water.

4. The preparation method of claim 1, wherein the carbon source in step 1) comprises one or more than two of glucose, fructose, sucrose, maltose, starch and citric acid; and the concentration of the carbon source in the carbon source aqueous solution is 0.1-6 M.

5. The preparation method of claim 1, wherein the heating reaction in step 1) is a hydrothermal reaction, the hydrothermal reaction is performed in a reactor, the hydrothermal reaction is performed in a temperature range of 175-220° C. for 100-180 min; and drying is performed in a temperature range of 60-100° C. for 6-24 h.

6. The preparation method of claim 1, wherein in step 2), the adsorption temperature is 20-60° C.; the adsorption time is 1-48 h; the drying temperature is 60-100° C.; and the drying time is 6-24 h; and
   in step 3), the adsorption temperature is 20-60° C.; the adsorption time is 4-24 h; the drying temperature is 60-100° C.; and the drying time is 6-24 h.

7. The preparation method of claim 1, wherein the calcinating in step 4) is performed in a muffle furnace, a tube furnace or a kiln;
   the calcination temperature is 200-600° C., the calcination time is 0.5-10 h, and the heating rate of calcination is 0.1-20° C./min; and
   the calcination atmosphere is air or a mixture of nitrogen and oxygen, wherein oxygen accounts for 5%-40% in the mixture of nitrogen and oxygen.

8. An amorphous metal oxide hollow multi-shell material, wherein the amorphous metal oxide hollow multi-shell material is obtained through the preparation method of claim 1.

9. The amorphous metal oxide hollow multi-shell material of claim 8, wherein the amorphous metal oxide hollow multi-shell material comprises at least one cavity and at least one layer of shell wall, wherein the surface of the shell wall is stacked with two or more metal oxides, the metal oxides are nanoparticles or nanorods; and the metal oxides comprise one or more than two of tantalum oxide, niobium oxide, hafnium oxide, rhenium oxide, titanium oxide, and tungsten oxide;
   two to four layers of shell walls are available; and the shell wall can absorb solar spectrum in multi stages in sequence;
   wherein
   the metal oxides stacked on the surface of the shell wall are defect-controllable;
   an ultraviolet light part, a visible light part, a near-infrared light part and a mid-infrared light part in the solar spectrum are absorbed in multi stages in sequence; and
   the absorbance of the metal oxides of the shell wall is within 10-95%.

10. A metal oxide material used for photo-thermal water evaporation, wherein the metal oxide material used for photo-thermal water evaporation comprises the amorphous metal oxide hollow multi-shell material of claim 8.

* * * * *